Sept. 26, 1961     B. DE KALBERMATTEN     3,001,416
MACHINES OPERATING ON SHEETS
Filed June 29, 1959
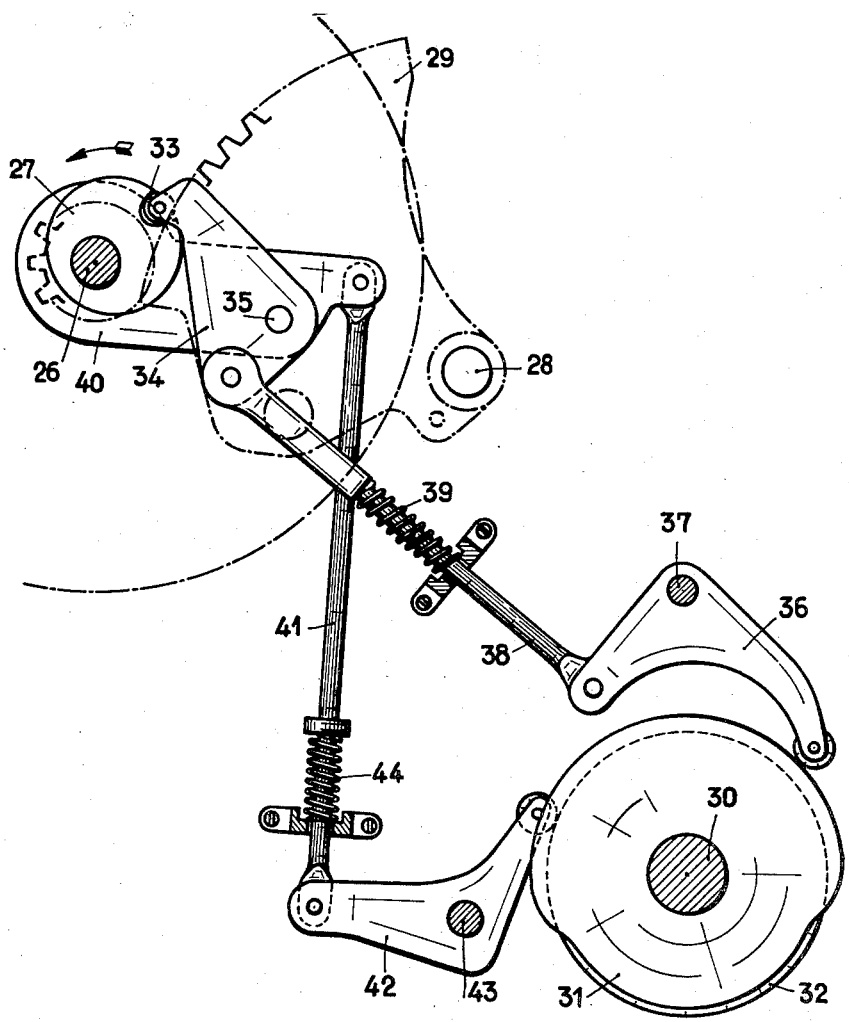

United States Patent Office 3,001,416
Patented Sept. 26, 1961

3,001,416
MACHINES OPERATING ON SHEETS
Bruno de Kalbermatten, Lausanne, Switzerland, assignor to J. Bobst and Son S.A., Lausanne, Switzerland, a corporation of Switzerland
Filed June 29, 1959, Ser. No. 823,526
Claims priority, application Switzerland June 30, 1958
5 Claims. (Cl. 74—527)

The invention relates to machines for operating on sheets wherein the sheets are successively conveyed by gripper bars which are mounted between two endless chains adapted to be selectively driven and stopped.

In such machines it is difficult to obtain, at one and the same time, high speeds and perfect precision. This is because, firstly, the inertia of the moving masses opposes rapid stops and starts and, secondly, because chains are subject to irregular wear and cannot be relied on to stop at any precise position.

It is an object of the invention to provide that the immobilization of the above bars be effected in an exactly controlled position.

In the drawing: FIGS. 1–5 illustrate the type of machine to which the invention is applied; and FIG. 6 illustrates the improvement of the invention.

It is a further object of the invention to provide a detent mechanism for a supplementary advance of the chains to bring the gripper bars into contact with corresponding abutments when the chain has been immobilized.

According to the present invention, the supplementary advance is obtained with an arrangement whereby a chain driving member is solid with a cam, in a peripheral notch of which a roller is periodically pressed fixing thereby the position of immobilization of this member, this roller receiving during each operation a movement to transmit to the chain driving member the angular displacement of predetermined value in the normal travel of the chains.

In accordance with one preferred embodiment of the invention a rotatable shaft drives a conveyor. A cam which has a peripheral notch is fixed on the shaft. A lever is pivotally supported on the shaft. A record lever is pivoted to the first lever. Moreover the second lever has a roller thereon for selectively engaging the notch of the cam. Means are provided for selectively engaging the first lever to displace the second lever and thereby rotate the shaft through the intermediary of the cam and the notch. The means includes a rod which is pivoted to the first lever and which is controlled by a cam.

Other objects and features of the invention will be found in the following detailed description of a preferred embodiment thereof as illustrated in the accompanying drawing in which a detent mechanism according to the invention is diagrammatically illustrated.

Element 26 is the shaft of the chain driving means or arbor, for driving a pair of chain wheels, the position of which wheels is represented by a dotted and dashed line and which wheels are rotatively fixed to the cam 27.

Element 28 is the turning shaft for sector 29, the balancing of which is designed to drive the shaft 26 periodically in the direction of the arrow.

Element 30, finally, is the driving arbor of the assembly, the crank pin (not shown) of which causes the balancing of sector 29, but which supports moreover two cams 31 and 32, whose functions are explained hereafter.

First, it should be noted that the cam 27 constitutes one of the two members ensuring the immobilization of the chain wheels, while a gripper bar occupies a station wherein it seizes a registered sheet, and another gripper bar maintains at the same time a sheet in the operating position.

The other member is a roller 33, which a lever 34 turning on a pin 35 urges periodically into a cam notch. This function is controlled by the cam 31 through the lever 36 pivoted on pin 37 and the rod 38 subject to the action of the adjusting spring 39. The position of immobilization of the cam 27 is thus angularly well determined, provided that the intervening point of the roller 33 is likewise determined.

The pivot 35 of the lever 34 is not fixed, but is disposed instead on a lever 40 pivoted on shaft 26 and linked by the rod 41 to the lever 42, the turning of which around pin 43 is controlled by the cam 32 against the action of the adjusting spring 44. The object of this arrangement is as follows:

At each immobilization of the conveying member of the press, when the cam 27 is blocked by the roller 33, the rod 41 which is pushed back by the combined action of the cam 32 and spring 44 causes the lever 34 to oscillate under the action of this latter, so as to displace the pivot 35 concentrically around the shaft 26, in the direction of the arrow. As a result, the displacement caused by the supplementary advance of the chain wheels, the conveying chains and the gripper bars will bring the gripper bars elastically into the correct position against their abutments, stretching at the same time the sheet which is in the operating position between the platens.

Once this sheet is operated on, the cam 27 is set free and the lever 34 brought back into its starting position by the positive action of the cam 32, while the chain wheels are subjected to a further driving through one turn and so forth.

What I claim is:
1. A detent mechanism for a conveyor comprising a rotatable shaft for driving the conveyor, a cam having a peripheral notch supported on said shaft, a lever pivotal on said shaft, a pivot on said lever, a second lever pivoted on said pivot, a roller on said second lever for engaging said notch and immobilizing said shaft, a rod pivoted to said second lever, a bearing supporting the rod for longitudinal displacement, a further cam, a cam follower on said rod engaging and controlled by said further cam, a second shaft supporting said further cam, a third cam on said second shaft, a second cam follower engaging said third cam, a rod coupled to said second cam follower, and a bearing supporting the latter said rod for longitudinal displacement, the latter said rod being pivoted to the first said lever for pivoting the latter about the first said shaft, said further cam controlling engagement of the roller in said notch, said third cam controlling a pivoting of the first said lever and thereby a movement of said pivot to rotate said rotatable shaft.

2. A mechanism as claimed in claim 1 wherein said rods comprise resiliently connected sectons.

3. A detent mechanism comprising a rotatable shaft, a cam having a peripheral notch fixed on said shaft, a lever freely pivotal on said shaft, means on said lever for selectively engaging the notch, and means for selectively engaging and pivoting said lever to displace the first said means and rotate the shaft through the intermediary of said cam and notch, the second said means comprising a rod pivoted to said lever and a cam engaging and controlling the rod, the first said means comprising a lever pivoted on the first said lever and a roller on the second said lever for engaging in said notch.

4. A mechanism as claimed in claim 3 comprising a rod pivoted to the second said lever and a cam engaging and controlling the latter said rod.

5. A mechanism as claimed in claim 4 comprising a shaft supporting both the second and third said cams.

References Cited in the file of this patent

UNITED STATES PATENTS

| | | |
|---|---|---|
| 554,724 | Dummer | Dec. 17, 1895 |
| 997,026 | Vickery | July 4, 1911 |
| 1,288,780 | White | Dec. 24, 1918 |
| 2,221,500 | Upham | Nov. 12, 1940 |
| 2,410,611 | Pratt et al. | Nov. 5, 1946 |
| 2,608,407 | Briechle | Aug. 26, 1952 |
| 2,880,997 | Brown | Apr. 7, 1959 |

FOREIGN PATENTS

| 937,543 | France | Mar. 15, 1948 |